(12) United States Patent
Watanabe

(10) Patent No.: US 10,392,008 B2
(45) Date of Patent: Aug. 27, 2019

(54) CONTROL DEVICE FOR FOUR-WHEEL DRIVE VEHICLE

(71) Applicant: TOYOTA JIDOSHA KABUSHIKI KAISHA, Toyota-shi, Aichi (JP)

(72) Inventor: Ryochi Watanabe, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 15/892,946

(22) Filed: Feb. 9, 2018

(65) Prior Publication Data

US 2018/0237003 A1    Aug. 23, 2018

(30) Foreign Application Priority Data

Feb. 20, 2017    (JP) .................................. 2017-028660

(51) Int. Cl.
*B60W 30/045* (2012.01)
*B60W 10/14* (2012.01)
(Continued)

(52) U.S. Cl.
CPC .......... *B60W 30/045* (2013.01); *B60W 10/14* (2013.01); *B60W 10/18* (2013.01); *B60W 10/184* (2013.01); *B60W 30/18109* (2013.01); *B60W 30/18145* (2013.01); *B60W 30/18172* (2013.01); *B60W 40/105* (2013.01); *B60W 2520/14* (2013.01); *B60W 2520/26* (2013.01); *B60W 2520/28* (2013.01);
(Continued)

(58) Field of Classification Search
None
See application file for complete search history.

(56) References Cited

U.S. PATENT DOCUMENTS 5,700,073 A * 12/1997 Hiwatashi ............. B60T 8/1755
                                                      180/197
5,742,917 A *  4/1998 Matsuno ............ B60K 17/3462
                                                      180/197
(Continued)

FOREIGN PATENT DOCUMENTS

JP    H08-053058 A    2/1996
JP    H11-123946 A    5/1999

OTHER PUBLICATIONS

May 2, 2019 U.S. Office Action issued U.S. Appl. No. 15/794,828.
U.S. Appl. No. 15/794,828, filed Oct. 26, 2017 in the name of Watanabe.

*Primary Examiner* — Dirk Wright
(74) *Attorney, Agent, or Firm* — Oliff PLC

(57) ABSTRACT

A control device for a four-wheel drive vehicle includes a differential restriction device which varies a differential restriction degree between a front wheel rotary shaft and a rear wheel rotary shaft, a differential restriction device and control units for controlling the differential restriction device. The control device is configured to control a behavior when the vehicle is being braked. Further, the control unit is configured to lower the differential restriction degree when a yaw rate of the vehicle is lower than a predetermined yaw rate threshold and a time decreasing rate of an estimated vehicle body speed which is a vehicle body speed estimated based on a wheel speed of the vehicle falls below a predetermined decreasing rate when the vehicle is being braked, in a vicinity of a maximum value.

8 Claims, 9 Drawing Sheets

(51) Int. Cl.
   *B60W 10/18*   (2012.01)
   *B60W 40/105*  (2012.01)
   *B60W 30/18*   (2012.01)
   *B60W 10/184*  (2012.01)

(52) U.S. Cl.
   CPC ..... *B60W 2540/12* (2013.01); *B60W 2710/12* (2013.01); *B60W 2710/18* (2013.01); *B60W 2720/14* (2013.01); *B60W 2720/26* (2013.01); *B60W 2720/403* (2013.01)

(56) References Cited

U.S. PATENT DOCUMENTS

| | | | |
|---|---|---|---|
| 6,189,643 B1 | 2/2001 | Takahashi et al. | |
| 6,442,469 B1 * | 8/2002 | Matsuno | B60K 23/0808 303/140 |
| 6,564,140 B2 * | 5/2003 | Ichikawa | B60K 23/0808 180/197 |
| 6,708,088 B2 * | 3/2004 | Matsuno | B60T 8/172 701/1 |
| 7,761,208 B2 * | 7/2010 | Matsuno | B60W 10/119 303/146 |
| 9,026,324 B2 * | 5/2015 | Matsuno | B60K 17/35 701/53 |
| 2002/0007239 A1 | 1/2002 | Matsumoto et al. | |
| 2003/0218378 A1 | 11/2003 | Tanaka et al. | |
| 2004/0267427 A1 | 12/2004 | Suzuki et al. | |
| 2007/0213913 A1 | 9/2007 | Ushiroda et al. | |
| 2010/0023184 A1 | 1/2010 | Yamamura et al. | |
| 2011/0314960 A1 | 12/2011 | Yoshimura | |
| 2019/0152454 A1 * | 5/2019 | Watanabe | B60T 8/17551 |

\* cited by examiner

CONTROL DEVICE FOR FOUR-WHEEL DRIVE VEHICLE

BACKGROUND OF THE INVENTION

1. Field of the Invention

The present invention relates to a control device for a four-wheel drive vehicle which is provided with a differential restriction device for limiting/restricting differential between a front wheel rotary shaft and a rear wheel rotary shaft.

2. Description of the Related Art

In general, a center differential device of a four-wheel drive vehicle is provided with a differential restriction control device, which controls a differential restriction degree between front wheels and rear wheels. Hitherto, a differential restriction control device (hereinafter, referred to as a "conventional device") is known, which is configured to lower the differential restriction degree between the front wheels and the rear wheels when a breaking control with an anti-skid control is executed on a travelling road having a low friction coefficient of a road surface (hereinafter, also referred to as a "low μ road") under a high differential restriction degree between the front wheels and the rear wheels (a strong tendency of a four-wheel drive mode) (for example, refer to Japanese Patent Application Laid-open (Kokai) No. H08-53058).

In a state where a "tendency of the four-wheel drive mode" is strong, a wheel speed of the front wheels and a wheel speed of the rear wheels become closer to each other. For example, in the state where the tendency of the four-wheel drive mode is strong, when the braking control is executed while the vehicle is travelling on the low p road where the wheels tend to slip, the wheel speed of either the front wheels or the rear wheels decreases, wheel speeds of all four wheels tend to decrease. In anti-skid control, in general, since a highest wheel speed of the wheel speeds of all of the wheels is selected and is used to estimate a vehicle body speed. Therefore, when the wheel speeds of all four wheels decrease, the estimated vehicle body speed becomes close to the speeds of all of the four wheels, and thus, becomes lower than an actual vehicle body speed. Thus, a braking slip ratio acquired as a ratio of a difference (deviation) between the vehicle body speed and the wheel speed to the vehicle body speed becomes lower than an actual braking slip ratio (acquired based on the actual vehicle body speed).

Consequently, even if the actual braking slip ratio is beyond an appropriate braking slip ratio and becomes a braking slip ratio at which the anti-skid control should be executed, the anti-skid control (in other words, a control which makes the braking slip ratio smaller so that the braking slip ratio is in an appropriate range) may not be executed or may be delayed. That is, when the vehicle travels on the low μ road in a state where the tendency of the four-wheel drive mode is strong, an operation delay of the anti-skid control may occur. Therefore, the conventional device is configured to lower the differential restriction degree between the front wheels and rear wheels by bringing the drive mode close to a two-wheel drive mode.

In the meantime, the ground contact load (grounding contact pressure) of the rear wheels is generally smaller than the ground contact load of the front wheels. That is, a friction circle of each of the rear wheels is smaller than a friction circle of each of the front wheels. Therefore, when a breaking force of the rear wheels becomes excessive, a lateral force of the rear wheels becomes insufficient so that the vehicle easily spins.

In view of the above, a distribution ratio of the braking force for the rear wheels to the front wheels is normally set lower than an ideal distribution ratio based on a ratio of the ground contact load of the rear wheels to the ground contact load of the front wheels. Accordingly, for example, while the vehicle is cornering on the low μ road, when the braking control is executed in a state where the differential restriction degree between the front wheels and the rear wheels is low, a braking force of the front wheels becomes excessively large so that a lateral force of the front wheels becomes excessively small. As a result, a problem occurs that an understeering tendency of the vehicle becomes enhanced/excessive.

As described above, in the conventional device lowers the differential restriction degree between the front wheels and the rear wheels while the braking control on the low p road is being executed, so that the operation delay of the anti-skid control can be prevented. However, according to the conventional device, the understeering tendency may become excessive when the vehicle is cornering/turning.

SUMMARY OF THE INVENTION

The present invention is made to solve the problem mentioned above. That is, one of the objects of the present invention is to provide a control device for a four-wheel drive vehicle, which can prevent an increase of an understeering tendency during braking control while the vehicle is cornering/turning, and which can prevent the operation delay of the anti-skid control of the vehicle during the braking control while the vehicle is running straight.

A control device for a four-wheel drive vehicle (hereinafter, referred to as a "present invention device") is applied to a four-wheel drive vehicle having:

a driving unit (20) which generates a driving force;

a center differential device (31) which transmits the driving force to a front wheel rotary shaft (32) and a rear wheel rotary shaft (33) and allows a differential operation between the front wheel rotary shaft and the rear wheel rotary shaft;

a differential restriction device (34) which varies a differential restriction degree (Tcu) between the front wheel rotary shaft and the rear wheel rotary shaft; and a braking device (40) which applies a braking force to each of a plurality of wheels (WFL, WFR, WRL, and WRR) of the vehicle (10), wherein, a braking force distribution ratio of rear wheels to front wheels is set so as to be lower than an ideal distribution ratio which is based on a ground contact load ratio of the rear wheels to the front wheels, when the differential restriction degree by the differential restriction device is set to a first restriction degree (for example, Tcu=0).

The present invention device comprises wheel speed sensors (82), a yaw rate sensor (84), and a control unit (50, 60, and 70). Each wheel speed sensor detects a wheel speed (Vw) which is a rotational speed of each of a plurality of the wheels. The yaw rate sensor detects a yaw rate (Yr) of the vehicle.

The control unit:

varies the braking force applied to each of the wheels in response to a braking operation performed by the driver of the vehicle;

estimates a speed of a body of the vehicle as an estimated vehicle body speed (Vx) using a maximum wheel speed among a plurality of the detected wheel speeds;

calculates a braking slip ratio (SL) of each of the wheels based on the estimated vehicle body speed and the respective wheel speeds; and executes an anti-skid control for adjusting the braking force applied to the respective wheels based on the braking slip ratio of the respective wheels.

Further, the control unit sets the differential restriction degree by the differential restriction device to a second restriction degree (for example, Tcu=Tcumax) which is larger than the first restriction degree, when the braking operation is being performed.

According to the above configuration, when the braking operation is being performed, the differential restriction degree is set to the second restriction degree which is larger than the first restriction degree. Thus, a difference between the wheel speed of the front wheel and the wheel speed of the rear wheel becomes small, and therefore, the braking slip ratio of the front wheels becomes close to a braking slip ratio of the rear wheel. Therefore, the braking force distribution ratio between the front wheels and the rear wheels comes closer to the ideal distribution ratio based on the ground contact load ratio between the front wheels and the rear wheels. For example, the first restriction degree is realized by setting the coupling torque to 0 so that there is no restriction. The second restriction degree is realized by setting the coupling torque to the maximum value of the coupling torque. In this example, the difference between the wheel speed of the front wheel and the wheel speed of the rear wheel becomes zero, and the braking slip ratio of the front wheel becomes equal to the braking slip ratio of the rear wheel. Thus, the braking force of the front wheel decreases and the braking force of the rear wheel increases as compared with a case where the differential restriction degree is set to the first restriction degree. Consequently, the understeering tendency during braking control while the vehicle is cornering/turning, becomes weak since a lateral force of the front wheels increases and a lateral force of the rear wheels decreases.

Meanwhile, when the vehicle is traveling straight or traveling substantially straight (in other words, when the yaw rate of the vehicle is lower than a predetermined yaw rate threshold), a wheel speed of a left wheel and a wheel speed of a right wheel becomes close to each other. For example, the wheel speed of the left wheel and the wheel speed of the right wheel are substantially equal to each other while the vehicle is travelling straight. In this instance, if the differential restriction degree between the front wheels and the rear wheels is set to the second restriction degree, the wheel speed of the front wheels and the wheel speed of the rear wheels become closer to each other, and thus, the wheel speeds of all of the wheels become closer to each other. Therefore, the wheel speeds of the rear wheels (two of the rear wheels) decrease when the wheel speeds of the front wheels (two of the front wheels) decrease. As described above, when the wheel speeds of all the four wheels decrease simultaneously, the estimated vehicle body speed becomes a speed which is close to the wheel speeds of all of the four wheels and is lower than an actual vehicle body speed. Therefore, the calculated braking slip ratio becomes smaller than an actual braking slip ratio. Thus, when the differential restriction degree between the front wheels and the rear wheels is set to the second restriction degree, start timing of the anti-skid control may be delayed.

In view of the above, in order to solve the problem mentioned above, the control unit is configured to:

determine whether a specific state has occurred in which the detected yaw rate is lower than a predetermined yaw rate threshold (Yrm<|Yrth|) and a magnitude of a decreasing amount of the maximum wheel speed (Vwsel) among a plurality of the detected wheel speeds for a predetermined time is larger than a decreasing amount threshold (Tαdws≥T1th) when the braking operation is being performed (Pm≥Pmth); and set the differential restriction degree by the differential restriction device to a third restriction degree which is smaller than the second restriction degree when it is determined that the specific state has occurred (Step 945).

According to the device of the present invention, the maximum wheel speed among the plurality of detected wheel speeds is selected as the estimated vehicle body speed. However, as described above, when the braking operation is being performed, if the wheel speed of the rear wheels decreases with the decrease of the wheel speed of the front wheels, the specific state may occur in which a magnitude of the estimated vehicle body speed for the predetermined time is larger than a decreasing amount threshold. In this instance, the device of the present invention sets the differential restriction degree to the third restriction degree which is smaller than the second restriction degree. Accordingly, the wheel speed of the rear wheels is adjusted according to the braking force of the rear wheels without being influenced by the wheel speed of the front wheels. Therefore, the wheel speed of the rear wheels increases to become closer to a speed at which the rear wheels originally rotates and closer to the actual vehicle body speed. Consequently, the estimated vehicle body speed becomes roughly equal to the actual vehicle body speed, an operating condition of the anti-skid control is established earlier and the operation delay of the anti-skid control can be prevented. The third restriction degree may be the same as the first restriction degree, and for example, the third restriction degree may be a degree realized when the coupling torque may be a value of zero.

Thus, according to the above configuration, it is possible to prevent the understeering tendency of the vehicle from being enhanced in the braking control while the vehicle is cornering/turning, and is possible to prevent the operation delay of the anti-skid control of the vehicle in the braking control when the vehicle is travelling straight.

When the vehicle is cornering/turning and being braked, the inner wheels tend to slip more easily than the outer wheel. Thus, when the vehicle is cornering/turning and being braked, the wheel speed of the turning inner wheel tends to decrease earlier than the wheel speed of the turning outer wheel. Accordingly, it is unlikely that the wheel speeds of all of the four-wheels decrease simultaneously even if the difference restriction degree between the front wheel rotary shaft and the rear wheel rotary shaft is set to a degree in the vicinity of a maximum restriction degree. Thus, it is reasonable to lower/weaken the differential restriction degree between the front wheel rotary shaft and the rear wheel rotary shaft when the yaw rate of the vehicle is less than the predetermined yaw rate threshold.

In one of the embodiments of the control device for a four-wheel drive vehicle according to the present invention, the control unit is configured to set the differential restriction degree to the third restriction degree by removing/releasing the differential restriction given by the differential restriction device.

According to this embodiment, when it is determined that the specific state has occurred in which the yaw rate of the vehicle is lower than the predetermined yaw rate threshold and the magnitude of a decreasing amount of the maximum wheel speed among a plurality of the detected wheel speeds for the predetermined time is larger than the decreasing amount threshold, the differential restriction degree between the front wheel rotary shaft and the rear wheel rotary shaft is released/extinguished. That is, the differential restriction degree is lowered to a "zero" degree. In other words, the coupling torque by the differential restriction degree is set to "zero". Consequently, the estimated vehicle body speed which has been decreasing can be made closer to the actual vehicle body speed earlier. Thus, the operation delay of the anti-skid control of the vehicle can be prevented earlier in the braking control while the vehicle is travelling straight.

In one of the embodiments of the control device for a four-wheel drive vehicle according to the present invention, the control unit is configured to:

- select the maximum wheel speed among a plurality of the wheel speeds every time a predetermined calculation period ($\Delta T$) elapses; and
- when a lower limit guard ($Vx(n-1)-\alpha dw \cdot \Delta T$) value is equal to or larger than the selected maximum wheel speed, set the estimated vehicle body speed at a present time point to the lower limit guard value, the lower limit guard value being calculated by subtracting the constant value ($\alpha dw \cdot \Delta T$) from the estimated vehicle body speed which was estimated at a time point the predetermined calculation period before the present time point; and
- determine that the specific state has occurred (step 945) when a case in which the lower limit guard value is set as the estimated vehicle body speed continues consecutively over a predetermined number of times ($T\alpha dw \geq T1th$).

In the above configuration, the lower limit guard value is a limit value ($Vx(n-1)-\alpha dw \cdot \Delta T$) in the calculation of the estimated vehicle body speed, and, for example, is determined by the estimated vehicle body speed ($Vx(n-1)$) which was estimated the calculation period before, the predetermined lower limit guard slope ($\alpha dw$) and the calculation period ($\Delta T$). The device of one of the embodiments according to the present invention described above determines that the specific state has occurred when the case in which the lower limit guard value is set as the estimated vehicle body speed continues consecutively over a predetermined number of times. Further, the device sets the differential restriction degree between the front wheel rotary shaft and the rear wheel rotary shaft to the third restriction degree which is smaller than the second restriction degree based on the determination result. Therefore, the anti-skid control can be started at a more appropriate time point without delay.

Furthermore, in a control device for a four-wheel drive vehicle according to one of embodiments of the present invention, the control unit is configured to set the yaw rate threshold to a value corresponding to a yaw rate which occurs when the vehicle is deemed to be travelling straight.

As described above, if the yaw rate which exceeds a certain level occurs, the wheel speeds of all of the four wheels are unlikely to decrease simultaneously since a difference arises between the wheel speed of the turning outer wheel and the wheel speed of the turning inner wheel. Therefore, the threshold of the yaw rate for setting the differential restriction degree to the third restriction degree may be set to a value corresponding to the yaw rate (a value in the vicinity of zero) which occurs when the vehicle is deemed to be travelling straight.

In the description given above, in order to facilitate understanding of the present invention, names and/or reference symbols used in an embodiment of the present invention described below are enclosed in parentheses, and are assigned to elements of the invention corresponding to the embodiment. However, the respective elements of the present invention are not limited to the embodiment defined by the names and/or the reference symbols. Other objects, other features, and accompanying advantages of the present invention are readily understood from a description of the embodiment of the present invention to be given referring to the following drawings.

DESCRIPTION OF THE EMBODIMENTS (Configuration)

Figure 1:
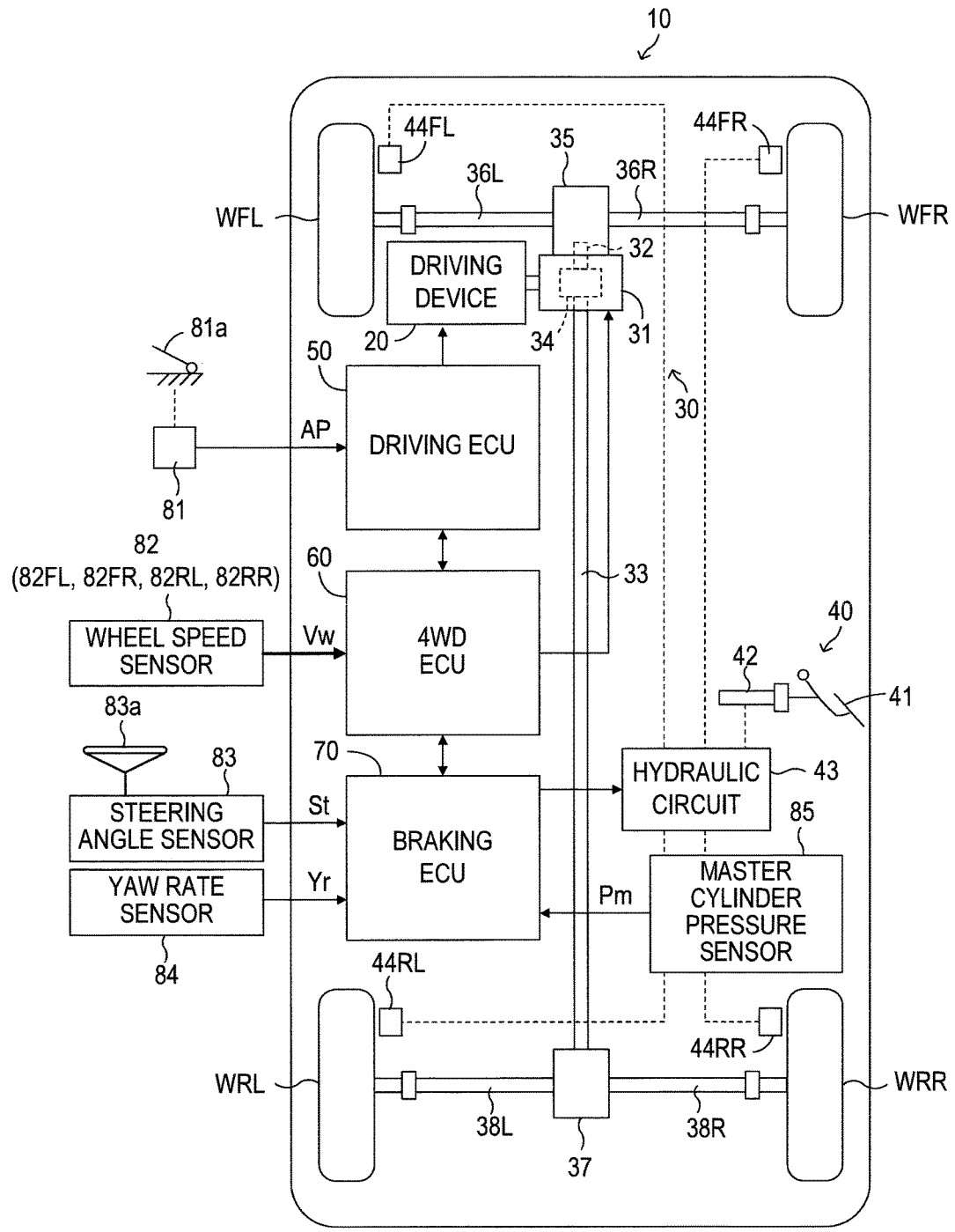
FIG. 1 is a schematic diagram for illustrating a control device for a four-wheel drive vehicle according to embodiment of the present invention.

A control device for a four wheel drive vehicle according to an embodiment of the present invention (hereinafter, referred to as a "present control device") is applied to a four wheel drive vehicle (hereinafter, simply referred to as a "vehicle") 10 as illustrated in FIG. 1.

The vehicle 10 comprises a driving device 20, a driving force transmission mechanism 30, a braking device 40, a driving ECU 50, a 4WD ECU 60, a braking ECU 70, and the like. These ECUs correspond to a control device of the present invention. It should be noted that two or more of these ECUs may be integrated into one ECU.

The ECU is an abbreviated word for an electronic control unit, and is an electronic control circuit including, as a main component, a microcomputer including a CPU, a ROM, a RAM, a backup RAM (or nonvolatile memory), an interface, and the like. The CPU is configured to execute instructions (routines) stored in the memory (ROM) to implement various functions described later.

The driving device 20 generates a driving force for driving wheels of the vehicle 10 (the front left wheel WFL, the front right wheel WFR, the rear left wheel WRL, and the rear right wheel WRR) via the driving force transmission mechanism 30. The driving device 20 may be any type of a driving device for a vehicle known in the art such as a combination of an internal combustion engine and a transmission of a general vehicle, a combination of an electric motor and a transmission, a hybrid system which is a combination of an internal combustion engine, an electric motor and a transmission, and the like, The driving force transmission mechanism 30 includes a center differential device 31, a front wheel rotary shaft 32, a rear wheel rotary shaft 33, a differential restriction device 34, a front wheel differential gear 35, a front left wheel axle 36L, a front right wheel axle 36R, a rear wheel differential gear 37, a rear left wheel axle 38L, a rear right wheel axle 38R, and the like.

The center differential device 31 is configured to transmit the driving force from the driving device 20 to the front wheel rotary shaft 32 and the rear wheel rotary shaft (propeller shaft) 33, and allow a difference of a rotation speed between the front wheel rotary shaft 32 and the rear wheel rotary shaft 33. In this embodiment, the center differential device 31 includes an electrically controlled differential restriction device 34, The differential restriction device 34 has a function to control a mutual restraining force between the front wheel rotary shaft 32 and the rear wheel rotary shaft 33 using a center coupling so as to vary a differential restriction degree between the front wheel rotary shaft 32 and the rear wheel rotary shaft 33. The mutual restraining force between the front wheel rotary shaft 32 and the rear wheel rotary shaft 33, that is, a coupling torque Tcu of the center coupling is controlled by the 4WD ECU 60.

The driving force of the front wheel rotary shaft 32 is transmitted to the front left wheel axle 36L and the front right wheel axle 36R through the front wheel differential gear 35, whereby the front left wheel WFL and the front right wheel WFR are rotationally driven. Similarly, the driving force of the rear wheel rotary shaft 33 is transmitted to the rear left wheel axle 38L and the rear right wheel axle 38R through the rear wheel differential gear 37, whereby the rear left wheel WRL, and the rear right wheel WRR are rotationally driven.

The braking device 40 includes a brake pedal 41, a master cylinder 42, a hydraulic circuit 43, a wheel cylinder 44 (44FL, 44FR, 44RL, and 44RR), and the like.

Braking pressures of the wheel cylinders 44FL, 44FR, 44RL, and 44RR are controlled through the hydraulic circuit 43, whereby corresponding braking forces of the front left wheel WFL, the front right wheel WFR, the rear left wheel WRL, and the rear right wheel WRR are controlled. The hydraulic circuit 43 includes a reservoir, an oil pump, various valve devices, and the like (not shown). The hydraulic circuit 43 functions as a brake actuator. As will be described later, the braking pressure of each wheel cylinder 44 is normally controlled by the braking ECU 70 based on the pressure (hereinafter, also referred to as a "master cylinder pressure") Pm of the master cylinder 42 which is driven in accordance with the depression operation of the brake pedal 41 by the driver, or the braking pressure of each wheel cylinder 44 is individually controlled as required.

The driving ECU 50 is connected to the 4WD ECU 60 and the braking ECU 70 so as to be capable of exchanging information via CAN (Controller Area Network) communication, as will be described later. The driving ECU 50 is electrically connected to an accelerator opening degree sensor 81, and the like. The driving ECU 50 is configured to receive output signals from these sensors. The accelerator opening sensor 81 is configured to generate an output signal representing an operation amount AP of an accelerator pedal 81a operated by the driver.

The 4WD ECU 60 is electrically connected to the wheel speed sensors 82 (82FL, 82FR, 82RL, and 82RR), and the like. The 4WD ECU 60 is configured to receive output signals from these sensors. The wheel speed sensors 82FL, 82FR, 82RL, and 82RR are configured to generate output signals representing the wheel speeds Vwfl, Vwfr, Vwrl, and Vwrr of the front left wheel WFL, the front right wheel WFR, the rear left wheel WRL, and the rear right wheel WRR respectively.

The braking ECU 70 is electrically connected to a steering angle sensor 83, a yaw rate sensor 84, a master cylinder pressure sensor 85, and the like. The braking ECU 70 is configured to receive output signals from these sensors. The steering angle sensor 83 is configured to generate an output signal representing a steering angle St of the steering wheel 83a operated by the driver. The yaw rate sensor 84 is configured to generate an output signal representing a yaw rate Yr of the vehicle 10. The master cylinder pressure sensor 85 is configured to generate an output signal representing the master cylinder pressure Pm. The steering angle sensor 83 and the yaw rate sensor 84 are configured to detect the steering angle St and the yaw rate Yr, respectively, in such a manner that each of the steering angle Sr and the yaw rate Yr is positive when the vehicle turns in a leftward direction.

Figure 2:
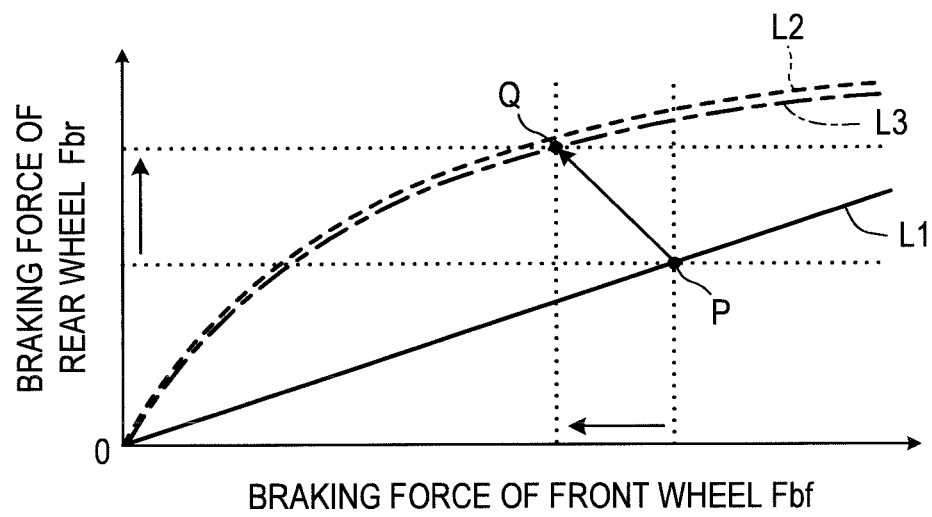
FIG. 2 is a diagram for describing a relationship between a braking force of a front wheel and a braking force of a rear wheel of a braking device illustrated in FIG. 1.

The braking ECU 70 calculates a target braking forces Fbflt, Fbfrt, Fbrlt, and Fbrrt of the front left wheel WFL, the front right wheel WFR, the rear left wheel WRL, and the rear right wheel WRR, respectively, based on the master cylinder pressure Pm. The braking ECU 70 controls the braking pressures of the wheel cylinders 44FL, 44FR, 44RL, and 44RR so that the respective braking forces become equal to the corresponding target braking force. A braking force distribution ratio of the rear wheel to the front wheel is indicated by a solid line L1 in FIG. 2 when the differential restriction degree between the front wheel rotary shaft 32 and the rear wheel rotary shaft 33 is set to be small, in other words, when the differential restriction degree is set to a first restriction degree. As understood from FIG. 2, in consideration of a manufacturing tolerances of the parts constituting the braking device 40, the braking force distribution ratio is set to be lower than the ratio of the ideal distribution line (broken line L2) based on the ground contact load ratio of the front left wheel WFL, the front right wheel WFR, the rear left wheel WRL, and the rear right wheel WRR. That is, the target braking force Fbflt of the front left wheel WFL and the target braking force Fbfrt of the front right wheel WFR are controlled so as to be higher than the braking force of the front wheels determined based on the ideal distribution ratio of the braking forces of the front wheel and the rear wheel, and so as to be higher than the target braking force Fbflt of the rear left wheel WRL and the target braking force Fbrrt of the rear right wheel WRR.

Figure 3:
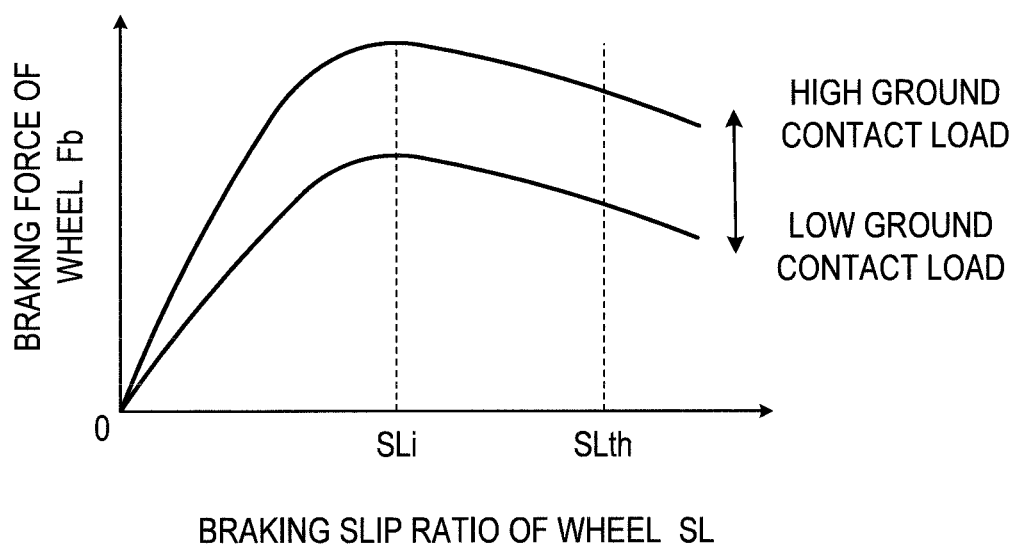
FIG. 3 is a diagram for describing a relationship between a braking slip ratio and a braking force of the braking device illustrated in FIG. 1.

As shown in FIG. 3, the braking force of the wheel increases as the braking slip ratio SL increases when the braking slip ratio SL is equal to or lower than a predetermined braking slip ratio (hereinafter, also referred to as an "ideal slip ratio") SLi which is determined by characteristics of a tire and the like, and the braking force of the wheel decreases as the braking slip ratio SL increases when the braking slip ratio SL is higher than the predetermined braking slip ratio SLi. Therefore, the braking ECU 70 calculates the braking slip ratio SL of each of the wheels based on the wheel speeds Vwfl, Vwfr, Vwrl, and Vwrr to execute the anti-skid control (hereinafter, also referred to as an "ABS control") known in the art.

The 4WD ECU 60 controls the coupling torque Tcu of the center coupling of the differential restriction device 34. The differential restriction device 34 allows a relative rotation between the front wheel rotary shaft 32 and the rear wheel rotary shaft 33 when the coupling torque Tcu is zero, and prevents the relative rotation between the front wheel rotary shaft 32 and the rear wheel rotary shaft 33 when the coupling torque Tcu is the maximum value Tcumax. Further, the differential restriction device 34 gradually raises the differential restriction degree between the front wheel rotary shaft 32 and the rear wheel rotary shaft 33 as the coupling torque Tcu increases when the coupling torque Tcu is a value between zero and the maximum value Tcumax.

Therefore, the coupling torque Tcu is an index value indicating the differential restriction degree of the differential restriction device 34, and a target coupling torque Tcut described later is an index value indicating a target differential restriction degree of the differential restriction device 34.

(Operation)

Figure 4:
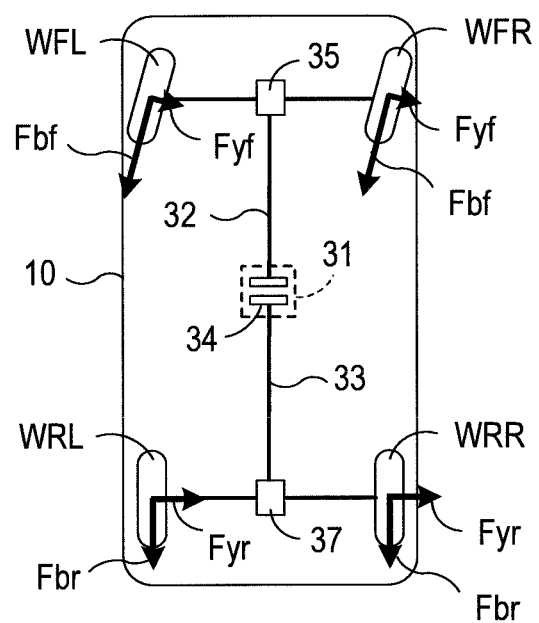
FIG. 4 is a diagram for describing a braking force and a lateral force when a differential restriction between a front wheel rotary shaft and a rear wheel rotary shaft is released when the vehicle is turning illustrated in FIG. 1.

The operation of the control device will next be described. First, a behavior of the vehicle 10 while it is being braked and cornering/turning will be described. As shown in FIG. 4, if the differential restriction degree is set to the first restriction degree (for example, the coupling torque Tcu is controlled to be "zero" or a value close to "zero") while the vehicle 10 is being braked and cornering/turning, the braking forces Fbf of the front left wheel WFL and the front right wheel WFR become large and the braking forces Fbr of the rear left wheel WRL and the rear right wheel WRR become small, since the braking force distribution ratio of the rear wheels to the front wheels is set to be low. Therefore, a lateral force Fyf of the front wheels become small and a lateral force Fyr of the rear wheels become large. Thus, the behavior of the vehicle 10 tends to be understeered behavior.

Figure 5:
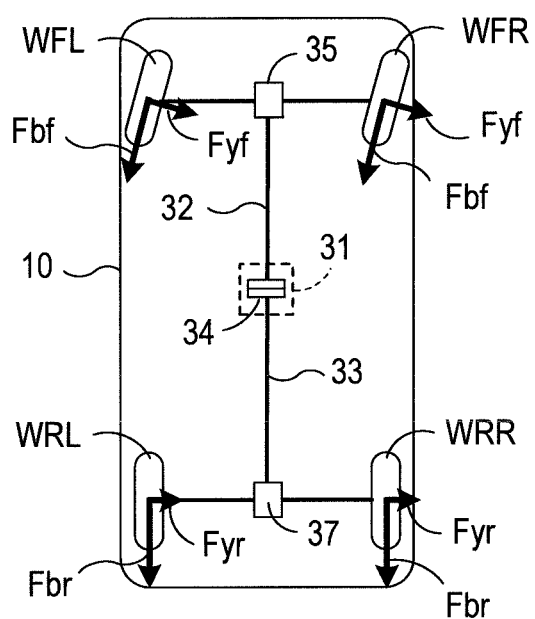
FIG. 5 is a diagram for describing the braking force and the lateral force when the differential between the front wheel rotary shaft and the rear wheel rotary shaft is limited when the vehicle is turning illustrated in FIG. 1.

On the other hand, as shown in FIG. 5, if the differential restriction degree is set to the second restriction degree larger than the first restriction degree (for example, the coupling torque Tcu is controlled to be the maximum value Tcumax or a value close to the maximum value Tcumax) while the vehicle 10 is being braked and cornering/turning, the wheel speeds Vwfl, Vwfr, Vwrl, and Vwrr of the respective wheels substantially coincide with (become equal to) each other. Therefore, the braking forces of the front wheels and the rear wheels become braking forces along the distribution line indicated by one-dot chain lines L3 close to the ideal distribution line indicated by the broken line L2 in FIG. 2, since the braking slip ratio of the front wheels and the rear wheels are substantially the same as each other.

In this instance, the friction circle of the front wheel becomes relatively small and the friction circle of the rear wheel becomes relatively large. Therefore, for example, assuming that the braking force Fbf of the front wheel and the braking force Fbr of the rear wheel while the coupling torque Tcu is controlled to be "zero" or a value close to "zero" are the values indicated by the point P in FIG. 2, the braking force Fbf of the front wheels and the braking force Fbr of the rear wheels change to the values indicated by the point Q in FIG. 2. In this manner, the braking force Fbf of the front left wheel WFL and the front right wheel WFR decrease, and the braking force Fbr of the rear left wheel WRL and the rear right wheel WRR increase. Consequently, the lateral force of the front wheel Fyf increases, the lateral force of the rear wheel Fyr decreases, so that the degree of understeering behavior of the vehicle 10 decreases.

<Anti-Skid Control>

The anti-skid control is a braking control which assists a main braking control for controlling the braking force of the wheels based on the braking operation by the driver. In the anti-skid control (ABS control), the braking slip ratio SL of each wheel is calculated according to the formula (1) using the wheel speed Vw of each wheel and the vehicle body speed Vb. The braking slip ratio SL is hereinafter also simply referred to as the "slip ratio SL".

$$SL=(Vb-Vw)/Vb \qquad (1)$$

Generally, the vehicle body speed Vb cannot be detected. Thus, an estimated vehicle body speed Vx which is estimated based on the wheel speed Vw is used to calculate the slip ratio SL in place of the vehicle body speed Vb. In the anti-skid control, the hydraulic pressure of the braking device 40 is controlled in such a manner that the slip ratio SL comes closer to the ideal slip ratio SLi (refer to FIG. 3) when the slip ratio SL of each wheel becomes higher than or equal to the predetermined slip ratio threshold SLth.

The estimated vehicle body speed Vx(n) (n is an integer) used for the anti-skid control is calculated by the following equation.

$$Vx(n)=MID(Vx(n-1)+\alpha up \cdot \Delta T, Vwsel, Vx(n-1)- \alpha dw \cdot \Delta T) \qquad (2)$$

Vx(n−1) represents a previous calculated value of the estimated vehicle body speed Vx(n). Vwsel represents a selected wheel speed. αup represents an upper limit guard slope (positive value) of the estimated vehicle body speed. αdw represents a lower limit guard slope (positive value) of the estimated vehicle body speed. ΔT represents a calculation period MID represents a function to select a median value. The highest wheel speed among the wheel speeds of the front left, the front right, the rear left, and the rear right wheels of the vehicle is selected as the selected wheel speed Vwsel for each calculation timing.

According to equation (1), the estimated vehicle body speed Vx(n) becomes an intermediate value (median value) among the following values (A) to (C).

(A) a value obtained by adding the product of the upper limit guard slope αup and the calculation period ΔT to the estimated vehicle body speed Vx(n−1) which is calculated at the previous calculation timing Tn−1, that is, the upper limit guard value of the estimated vehicle body speed Vx, (B) the selected wheel speed Vwsel, (C) a value obtained by subtracting a product of the lower limit guard slope αdw and the calculation period ΔT from the estimated vehicle body speed Vx(n−1), that is, the lower limit guard value of the estimated vehicle body speed Vx.

Figure 6:
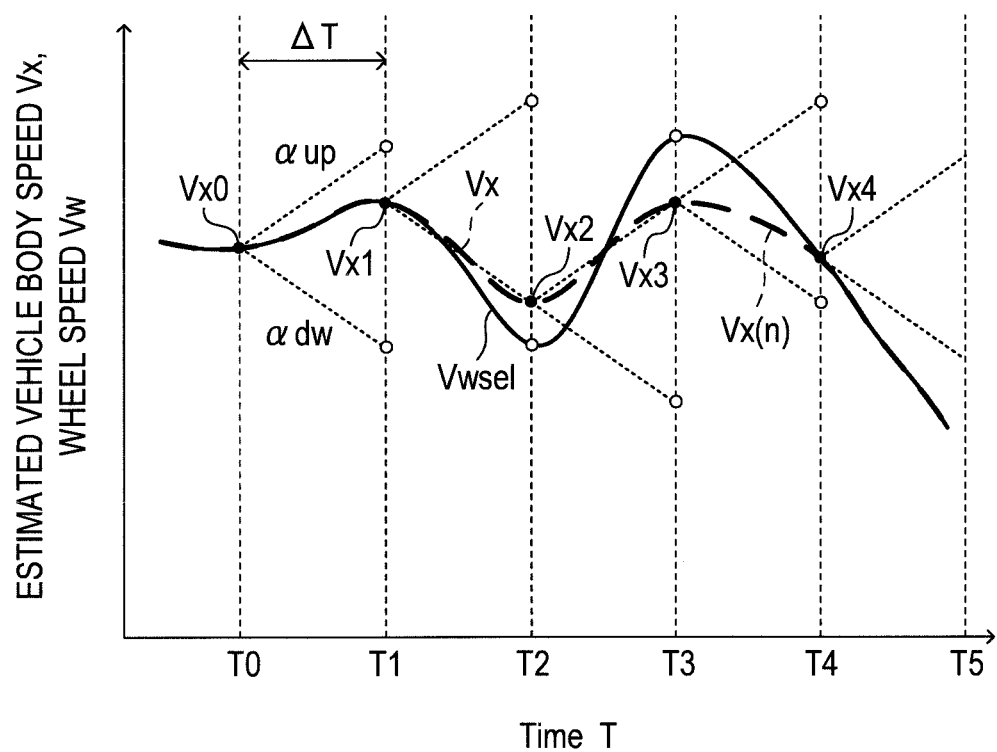
FIG. 6 is a diagram for describing a method of calculating an estimated vehicle body speed used by the braking device illustrated in FIG. 1.

Subsequently, a method of calculating the estimated vehicle body speed Vx will be described more specifically with reference to FIG. 6. The selected wheel speed Vwsel is indicated by a solid line in FIG. 6. The horizontal axis represents time, and time T0 to time T5 represent the calculation timings of the estimated vehicle body speed Vx(n) respectively. An interval between the calculation timings next to each other is the calculation period ΔT.

It is assumed that the selected wheel speed Vwsel is selected as the median value at the calculation timing T0. That is, it is assumed that the estimated vehicle body speed Vx (Vx0) corresponds to the selected wheel speed Vwsel at the calculation timing T0. In this instance, at the next calculation timing T1, the median value is selected among the value Vx0+αup·ΔT, the selected wheel speed Vwsel at the calculation timing T1, and the value Vx0−αdw·ΔT at the time T1. The value (Vx0+αup·ΔT) is a value on a line extending from the estimated vehicle body speed Vx0 at the calculation timing T0 with/at the upper limit guard slope αup, at the calculation timing T1. The value (Vx0−αdw·ΔT) is a value on a line extending from the estimated vehicle body speed Vx0 at the calculation timing T0 with/at the lower limit guard slope αdw, at the calculation timing T1. In the present example shown, the median value at the calculation timing T1 (that is, the estimated vehicle body speed Vx1) is the selected wheel speed Vwsel.

At the calculation timing T2, the median value is selected among the value Vx1+αup·ΔT, the selected wheel speed Vwsel at the calculation timing T2, and the value Vx1−αdw·ΔT. The value (Vx1+αup·ΔT) is a value on a line extending from the estimated vehicle body speed Vx1 at the calculation timing T1 with/at the upper limit guard slope αup, at the calculation timing T2. The value (Vx1−αdw·ΔT) is a value on a line extending from the estimated vehicle body speed Vx1 at the calculation timing T1 with/at the lower limit guard slope αdw, at the calculation timing T2. In the present example shown, the median value at the calculation timing T2 (that is, the estimated vehicle body speed Vx2) is the lower limit guard value Vx1−αdw·ΔT.

Further, at the calculation timing T3, the median value is selected among the value Vx2+αup·ΔT, the selected wheel speed Vwsel at the calculation timing T2, and the value Vx2−αdw·ΔT. The value (Vx2+αup·ΔT) is a value on a line extending from the lower limit guard value Vx1−αdw·ΔT (=Vx2) at the calculation timing T2 with/at the upper limit guard slope αup, at the calculation timing T3. The value (Vx2−αdw·ΔT) is a value on a line extending from the lower limit guard value Vx1−αdw·ΔT (=Vx2) at the calculation timing T2 with/at the lower limit guard slope αdw, at the calculation timing T3. In the present example shown, the median value at the calculation timing T3 (that is, the estimated vehicle body speed Vx3) is the upper limit guard value Vx2+αup·ΔT.

Similarly, the median value at the calculation timing T4 (that is, the estimated vehicle body speed Vx4) is the selected wheel speed Vwsel. The estimated vehicle body speed Vx(n) calculated in this manner is indicated by a thick broken line. Here, the number of times the upper limit guard value is selected consecutively is defined as the upper limit guard consecutive selection number Nup, and the number of times the lower limit guard value is selected consecutively is defined as the lower limit guard consecutive selection number Ndw. In the present example shown, neither the upper limit guard value nor the lower limit guard value is selected consecutively. Therefore, the upper limit guard consecutive selection number Nup is one, and the lower limit guard consecutive selection number Ndw is one.

The estimated vehicle body speed (or the selected wheel speed Vwsel) never sharply drops, if at least a wheel speed of one of the four wheels is close to the actual vehicle body speed Vbr. In this instance, the lower limit guard value is unlikely to be selected consecutively. In other words, the lower limit guard consecutive selection number Ndw is unlikely to become two or more. That is, it is inferred that all of the wheel speed of the front left wheel, the wheel speed of the front right wheel, the wheel speed of the rear left wheel, and the wheel speed of the rear right wheel are lower than the actual vehicle body speed Vbr, when the lower limit guard consecutive selection number Ndw is two or more.

That is, the control device is configured to select the maximum wheel speed Vwsel among a plurality of the wheel speeds Vw every time a predetermined calculation period ΔT elapses, and set the estimated vehicle body speed Vx(n) at the present time point to the lower limit guard value Vx(n−1)−αdw·ΔT when the lower limit guard value Vx(n−1)−αdw·ΔT is equal to or larger than the selected maximum wheel speed Vwsel. The lower limit guard value Vx(n−1)−αdw·ΔT is calculated by subtracting the constant value αdw·ΔT from the estimated vehicle body speed Vx(n−1) which is the estimated vehicle body speed Vx(n) at the time point the predetermined calculation period ΔT before the present time point.

Hereinafter, operations of the braking control by the present control device will be described using an exemplary situation where a decrease of the slip ratio of each of the wheel is occurring due to a slip of the front wheels when the braking control is performed in a case where the vehicle 10 is travelling straight and the differential restriction degree between the front wheel rotary shaft 32 and the rear wheel rotary shaft 33 is set to the second restriction degree (Tcu=Tcumax).

Figure 7:
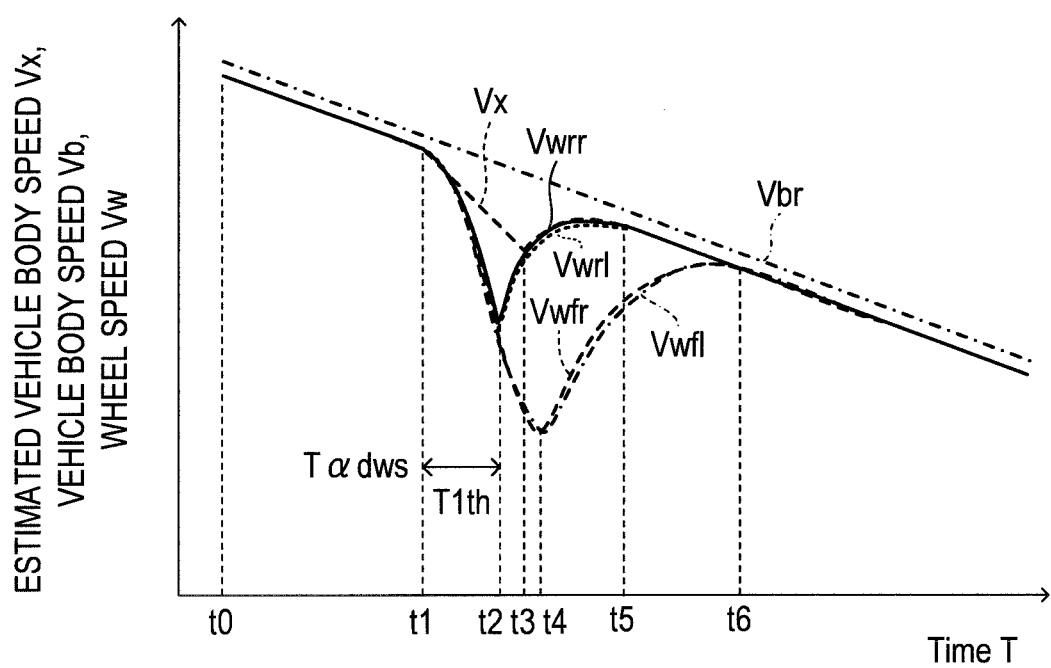
FIG. 7 is a graph showing a time variation of each wheel speed when the differential restriction between the front wheel rotary shaft and the rear wheel rotary shaft is released after a lower limit guard consecutive selection time has elapsed while the vehicle is travelling straight on a low µ road.

FIG. 7 shows the estimated vehicle body speed Vx, the vehicle body speed Vb and the wheel speed Vw of each of the wheel, from a start of braking, in the exemplary situation. In this example, it is assumed that braking is started at time t0, and thus, the actual vehicle body speed Vbr (shown by one-dot chain line in FIG. 7) decreases with the lapse of time, and each of the wheel speeds substantially coincides with the actual vehicle body speed Vbr during the period from time t0 to time t1. Assuming that the front left wheel speed Vwfl and the front right wheel speed Vwfr have decreased due to the slip of the front wheels in a state where the differential restriction degree between the front wheel rotary shaft 32 and the rear wheel rotary shaft 33 is high, the rear left wheel speed Vwrl and the rear right wheel speed Vwrr also begin to decrease together with the decrease of the front left wheel speed Vwfl and the front right wheel speed Vwfr. A time point at which the slip of each of the wheels occurs is time t1. In this example, the front left wheel speed Vwfl, the front right wheel speed Vwfr, the rear left wheel speed Vwrl, and the rear right wheel speed Vwrr satisfy a relationship of Vwfl<Vwfr<Vwrl<Vwrr while all of the wheel speeds of the four wheels are decreasing (in a period time t1 to time t2). Thus, the rear right wheel speed Vwrr, which is the highest wheel speed among the four wheel speeds is selected as the selected wheel speed Vwsel when calculating the estimated vehicle body speed Vx.

At time t1, the slope (decrease rate) of the rear right wheel speed Vwrr is smaller than the lower limit guard slope αdw, and therefore, the estimated vehicle body speed Vx is calculated as the lower limit guard value Vx(n−1)−αdw·ΔT based on the equation (2). The estimated vehicle body speed Vx is calculated to be the lower limit guard value Vx(n−1)−αdw·ΔT every time a predetermined calculation timing arrives since time t1.

The lower limit guard consecutive selection time Tαdws reaches a predetermined value T1th at time t2. Thus, at time t2, it is determined that a time decreasing rate of the estimated vehicle body speed Vx continues to be below a predetermined decreasing rate. In other words, when the lower limit guard value $Vx(n-1)-\alpha dw \cdot \Delta T$ is consecutively selected as the estimated vehicle body speed Vx the predetermined number of times, it is determined that a "specific state has occurred where the magnitude of the decrease amount of the maximum wheel speed among a plurality of the detected wheel speeds (Vwfl, Vwfr, Vwrl, and Vwrr) in a predetermined time is larger than the decrease amount threshold", and thus, the differential restriction between the front wheel rotary shaft 32 and the rear wheel rotary shaft 33 is removed/released/eliminated. That is, the lower limit guard consecutive selection time T$\alpha$dws is a product Ndw·$\Delta T$ of the lower limit guard consecutive selection number Ndw and the calculation period $\Delta T$.

At this moment, the wheel speeds Vwr of the rear wheels (the rear left wheel speed Vwrl and the rear right wheel speed Vwrr) start to increase since the braking control is performed again with the original braking force of the rear wheels. Then, the estimated vehicle body speed Vx starts to increase together with the rear right wheel speed Vwrr from the time t3 at which the lower limit guard value $Vx(n-1)-\alpha dw \cdot \Delta T$ which has been selected consecutively becomes equal to or less than the rear right wheel speed Vwrr which is the highest wheel speed among the four wheel speeds. The rear left wheel speed Vwrl is also starts to increase together with the estimated vehicle body speed Vx and the rear right wheel speed Vwrr from this time point. Thus, from this time point, the estimated vehicle body speed Vx becomes closer to the actual vehicle body speed Vbr.

Thereafter, the slip ratio SL of each of the front wheels (WFL and WFR) which is calculated by the equation (1) increases since the deviation between the estimated vehicle body speed Vx, and each of the front left wheel speed Vwfl and the front right wheel speed Vwfr increases as the estimated vehicle body speed Vx increases. A process for reducing the slip ratio SL to the ideal slip ratio SLi for the front left wheel WFL (hereinafter, referred to as a "slip ratio reduction process") starts to be executed when the slip ratio SL of the front left wheel WFL becomes equal to or larger than the predetermined slip ratio threshold value SLth at time t4. Thus, the wheel speed Vwfl of the front left wheel WFL starts to increase from time t4. The slip ratio reduction process is also executed for the front right wheel WFR since the slip ratio SL of the front right wheel WFR becomes equal to or higher than the predetermined slip ratio threshold SLth, so that the front right wheel speed Vwfr also starts to increase.

Thereafter, the wheel speed Vwrr of the rear right wheel WRR and the wheel speed Vwrl of the rear left wheel WRL substantially become equal to the actual vehicle body speed Vbr around time t5. The wheel speed Vwfr of the front right wheel WFR and the wheel speed Vwfl of the front left wheel WFL substantially become equal to the actual vehicle body speed Vbr around time t6.

The operation of the control device has been described above. Next, an operation of the conventional device will be described. The conventional device does not remove/release/eliminate the differential restriction degree even if the time decreasing rate of the estimated vehicle body speed Vx has been below the predetermined decreasing rate.

Figure 8:
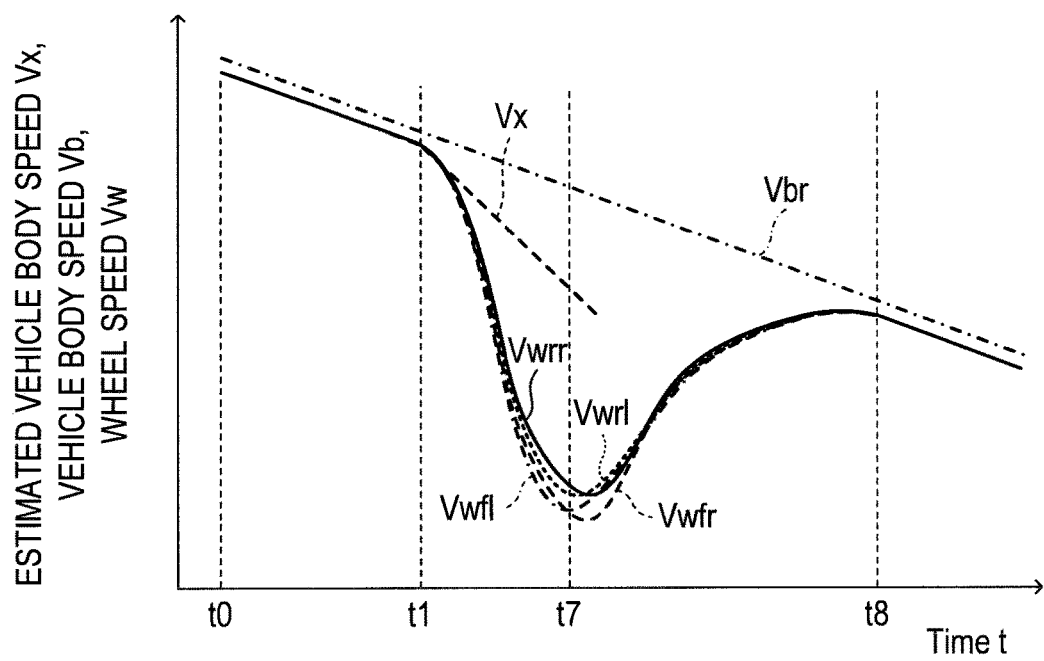
FIG. 8 is a graph showing a time variation of each wheel speed when the differential restriction between the front wheel rotary shaft and the rear wheel rotary shaft is not released after the lower limit guard consecutive selection time has elapsed while the vehicle is travelling straight on the low µ road.

As shown in FIG. 8, the estimated vehicle body speed Vx continues to decrease at the lower limit guard slope $\alpha$dw from time t1. In this instance, a deviation between the estimated vehicle body speed Vx and each of the wheel speeds Vwfl, Vwfr, Vwrl, and Vwrr gradually/moderately increases. The slip ratio SL of each of the wheels is determined in accordance with a ratio between the wheel speed Vw of each of the wheels and the estimated vehicle body speed Vx. Thus, while the deviation between the estimated vehicle body speed Vx and each of the wheel speeds Vwfl, Vwfr, Vwrl, and Vwrr gradually/moderately increases, it takes a considerable time for the slip ratio SL of each of the wheels becomes equal to or higher than the predetermined slip ratio threshold SLth. In the example shown in FIG. 8, the slip ratio SL of the front left wheel WFL becomes equal to or higher than the predetermined slip ratio threshold SLth at time t7 (which is later than time t2 shown in FIG. 7), and thus, the slip ratio reduction process is executed. As a result, the wheel speed Vwfl of the front left wheel WFL starts to increase from time t7. Thereafter, the slip ratio reduction process starts to be executed for each of the other wheels, when the slip ratio SL of each of the other wheels (the front right wheel WFR, the rear left wheel WRL, and the rear right wheel WRR) becomes equal to or higher than the predetermined slip ratio threshold SLth. As a result, the wheel speed of each of the other wheels starts to increase.

Thereafter, each of the wheel speed Vwrr of the rear right wheel WRR, the wheel speed Vwrl of the rear left wheel WRL, the wheel speed Vwfr of the front right wheel WFR, and the wheel speed Vwfl of the front left wheel WFL substantially becomes equal to the actual vehicle body speed Vbr around time t8.

In this manner, the present control device executes the slip ratio reduction process earlier than the conventional device which does not remove/release/eliminate the differential restriction (or which does not have the differential restriction degree be zero) when the time decreasing rate of the estimated vehicle body speed Vx continues to be below the predetermined decreasing rate. Consequently, the operation delay of the anti-skid control is shortened (the anti-skid control can be performed without an excessive operation delay).

(Specific Operation)
<Coupling Torque Reduction Control During Braking>

Hereinafter, the actual operation of the control device will be described with reference to FIG. 9. In the present example, the description will be made assuming that an initial value of the coupling torque Tcu is set at the maximum value Tcumax (the second restriction degree). The CPU of the braking ECU 70 is configured to execute a coupling torque reduction control routine illustrated by a flowchart of FIG. 9 every time a constant time elapses.

The CPU starts the process from Step 900 at a predetermined time point to proceed to Step 905 at which the CPU acquires the estimated vehicle body speed Vx based on the equation (2), and proceeds to Step 910 to acquire the lower limit guard consecutive selection time T$\alpha$dws.

Subsequently, the CPU proceeds to Step 915 to determine whether the braking operation is performed by the driver. In other words, the CPU determines whether the master cylinder pressure Pm is equal to or higher than the master cylinder pressure threshold Pmth (positive value). When the master cylinder pressure Pm is equal to or higher than the master cylinder pressure threshold Pmth, the CPU makes a "Yes" determination at Step 915 to proceed to Step 920 at which the CPU determines whether the braking force control by the ABS control is not being executed for any of the wheels. More specifically, the CPU determines whether the process (slip ratio reduction process) for decreasing the slip ratio to a value in the vicinity of the ideal slip ratio SLi is not executed, the ratio reduction process being executed when the slip ratio SL of any one of the wheels exceeds the predetermined slip ratio threshold SLth.

When the braking force control by the ABS control is not being executed for any of the wheels, the CPU makes a "Yes" determination at Step 920 to proceed to Step 925, at which the CPU determines whether the lower limit guard consecutive selection time Tαdws is "zero". When the lower limit guard consecutive selection time Tαdws is "zero", the CPU makes a "Yes" determination at Step 925 to proceed to Step 930, at which the CPU stores the yaw rate Yr detected by the yaw rate sensor 84 as a "lower limit guard selection start yaw rate Yrm" into the RAM. Then, the CPU proceeds to Step 935. On the other hand, when the lower limit guard consecutive selection time Tαdws is not "zero", the CPU makes a "No" determination at Step 925 to directly proceed to Step 935.

Subsequently, the CPU determines whether the lower limit guard consecutive selection time Tαdws is equal to or longer than the predetermined time T1th at Step 935.

When the lower limit guard consecutive selection time Tαdws is equal to or longer than the predetermined time T1th, the CPU makes a "Yes" determination at Step 935 to proceed to Step 940, at which the CPU determines whether the absolute value |Yrm| of the lower limit guard selection start yaw rate Yrm is lower than a predetermined yaw rate threshold Yrth. The predetermined yaw rate threshold Yrth is set at a value in the vicinity of "zero". Determining whether the absolute value |Yrm| of the lower limit guard selection start yaw rate Yrm is lower than the predetermined yaw rate threshold Yrth is the same as determining whether the vehicle is travelling straight. In other words, the predetermined yaw rate threshold Yrth is a value corresponding to the yaw rate which is generated when it can be determined that the vehicle 10 is travelling straight (or when the vehicle 10 is deemed to be travelling straight).

In this way, the CPU makes the determination at Step 940 using the lower limit guard selection start yaw rate Yrm instead of the yaw rate at the present time point (the time point at which the lower limit guard consecutive selection time Tαdws has become equal to or longer than the predetermined time T1th). The reasons are as follows. For example, the absolute value of the yaw rate may become large when the vehicle 10 slips to change its posture while the wheel speeds Vw of all of the four wheels are decreasing, even if the vehicle 10 is travelling straight. In this instance, if the CPU makes the determination at Step 940 using the yaw rate at the present moment, the CPU makes a "No" determination at Step 940. That is, it may be determined that the vehicle 10 is turning even when the vehicle 10 is travelling straight so that a start of the ABS control may be delayed when the wheel speeds Vw of all of the four wheels decrease.

When the absolute value |Yrm| of the lower limit guard selection start yaw rate Yrm is lower than the yaw rate threshold Yrth (that is, when the vehicle is travelling straight), the CPU makes a "Yes" determination at Step 940 to proceed to Step 945. The CPU sets the coupling torque Tcu to "zero" at Step 945. That is, the CPU removes/releases/eliminates the differential restriction degree (zeroize the differential restriction degree) between the front wheel rotary shaft 32 and the rear wheel rotary shaft 33 (the differential restriction degree is set to the third restriction degree smaller than the second restriction degree), and proceeds to Step 995 to tentatively terminate the present routine.

In contrast, when the lower limit guard consecutive selection time Tαdws is shorter than the predetermined time T1th, the CPU makes a "No" determination at Step 935 to proceed to Step 950, at which the CPU sets the coupling torque Tcu to the coupling torque (hereinafter, referred to as an "actual coupling torque Tcuact") determined by a coupling torque control routine which is executed separately. In other words, in this instance, the CPU maintains the coupling torque Tcu at the present moment. According to the above assumption, the coupling torque Tcu at the present moment is the maximum value Tcumax (the second restriction degree). Subsequently, the CPU proceeds to Step 995 to tentatively terminate the present routine.

Furthermore, when the absolute value |Yrm| of the lower limit guard selection start yaw rate Yrm is equal to or larger than the yaw rate threshold Yrth, the CPU makes a "No" determination at Step 940 to proceed to Step 950, at which the CPU sets the coupling torque Tcu as the actual coupling torque Tcuact and proceeds to Step 995 to tentatively terminate the present routine.

As described above, when the lower limit guard consecutive selection time Tαdws is shorter than the predetermined time T1th, the CPU maintains the value of the coupling torque Tcu at the actual coupling torque Tcuact even when the vehicle is travelling straight (|Yrm|<Yrth). For example, when the vehicle 10 is traveling on a traveling road (high μ road) having a high surface friction coefficient, it is unlikely that the wheel speeds of all of the four wheels deviate from the actual vehicle body speed Vbr to decrease simultaneously. Thus, in the above instance, it is not necessary to remove/release/eliminate the differential restriction between the front wheel rotary shaft 32 and the rear wheel rotary shaft 33.

Furthermore, as described above, when the vehicle 10 is turning on a travelling road (low μ road) having a low surface friction coefficient, the wheel speed of the inner wheel decreases/drops earlier than the wheel speed of the outer wheel, and thus, it is unlikely that the wheel speeds of all of the four wheels deviating from the actual vehicle body speed Vbr to simultaneously decrease. Therefore, in this instance, it is also unnecessary to remove/release/eliminate the differential restriction between the front wheel rotary shaft 32 and the rear wheel rotary shaft 33.

When the master cylinder pressure Pm is lower than the master cylinder pressure threshold Pmth (when the CPU makes a "No" determination at Step 915), or when the ABS control is being executed (when the CPU makes a "No" determination at Step 920), the CPU proceeds to Step 950 to set the coupling torque Tcu to the actual coupling torque Tcuact, and proceeds to Step 995 to tentatively terminate the present routine.

As described above, the control device comprises the control unit which:

changes the braking force applied to each of the wheels in response to the braking operation performed by the driver of the vehicle 10;

estimates the speed of the vehicle body as the estimated vehicle body speed Vx using the maximum wheel speed among a plurality of the detected wheel speeds Vw;

calculates the braking slip ratios SL of each of the wheels based on the estimated vehicle body speed Vx and the respective wheel speeds Vw;

executes the anti-skid control for adjusting the braking force applied to the respective wheels based on the braking slip ratios SL of the respective wheels; and further, sets the differential restriction degree by the differential restriction device 34 to the second restriction degree (Tcu=Tcumax) which is larger than the first restriction degree (Tcu=0) when the braking operation is being performed.

The control unit is configured to determine whether the specific state occurs in which the detected yaw rate Yr is lower than the predetermined yaw rate threshold Yrth and the magnitude of the decreasing amount of the maximum wheel speed Vwsel among a plurality of the detected wheel speeds Vw for the predetermined time is larger than the decreasing amount threshold when the braking operation is being performed, and set the differential restriction degree by the differential restriction device to the third restriction degree (Tcu=0) which is smaller than the second restriction degree (Tcu=Tcumax) when it is determined that the specific state occurs.

The control device thus configured is able to prevent the understeer tendency of the vehicle from becomes higher during the braking control while the vehicle is turning, and prevent the operation delay of the ABS control of the vehicle in the braking control while the vehicle is travelling straight.

<Modification>

The present invention is not limited to the above embodiment, and various modifications can be adopted within the scope of the present invention as described below.

In the above embodiment, whether the vehicle 10 is being braked is determined based on whether the master cylinder pressure Pm is equal to or higher than the master cylinder pressure threshold Pmth. However, whether the vehicle 10 is being braked may be determined based on whether the brake pedal depression amount BP is equal to or larger than the predetermined depression amount BPth.

In the above embodiment, when the vehicle 10 which is travelling straight is braked and the lower limit guard value is consecutively selected for the predetermined time in the calculation of the estimated vehicle body speed Vx, the differential restriction degree (the third restriction degree) by the differential restriction device 34 is set to "0", that is, the differential restriction is removed/released/eliminated. In contrast, the differential restriction degree (the third restriction degree) by the differential restriction device 34 may be set to a predetermined value, which is larger than "0" and lower than Tcu0, in the above situation.

In the above embodiment, whether the time decreasing rate of the estimated vehicle body speed Vx is below the predetermined decreasing rate (that is, whether the specific state has occurred) is determined based on the magnitude of the lower limit guard consecutive selection time Tαdws. However, whether the time decreasing rate of the estimated vehicle body speed Vx is below the predetermined decreasing rate may be determined based on whether an inclination of the selected wheel speed Vwsel is smaller than the lower limit guard slope αdw.

More specifically, according to the above modification, a deviation Vwsele-Vwsels between the selected wheel speed Vwsel=Vwsels at a start time point of the calculation period ΔT and the selected wheel speed Vwsel=Vwsele at an end time point of that calculation period ΔT is calculated. Thereafter, the above modification determines that the inclination of the selected wheel speed Vwsel is lower than the lower limit guard slope αdw, when the deviation (Vwsele−Vwsels) is negative (i.e., Vwsele−Vwsels<0) and an absolute value | Vwsele−Vwsels | of the deviation is smaller than an absolute value | αdw·ΔT | of the product of the lower limit guard slope αdw and the calculation period ΔT. It should be noted that it may be determined that the specific state has occurred when the slope of the selected wheel speed Vwsel is consecutively lower than the lower limit guard slope αdw a predetermined number of times.

Figure 9:
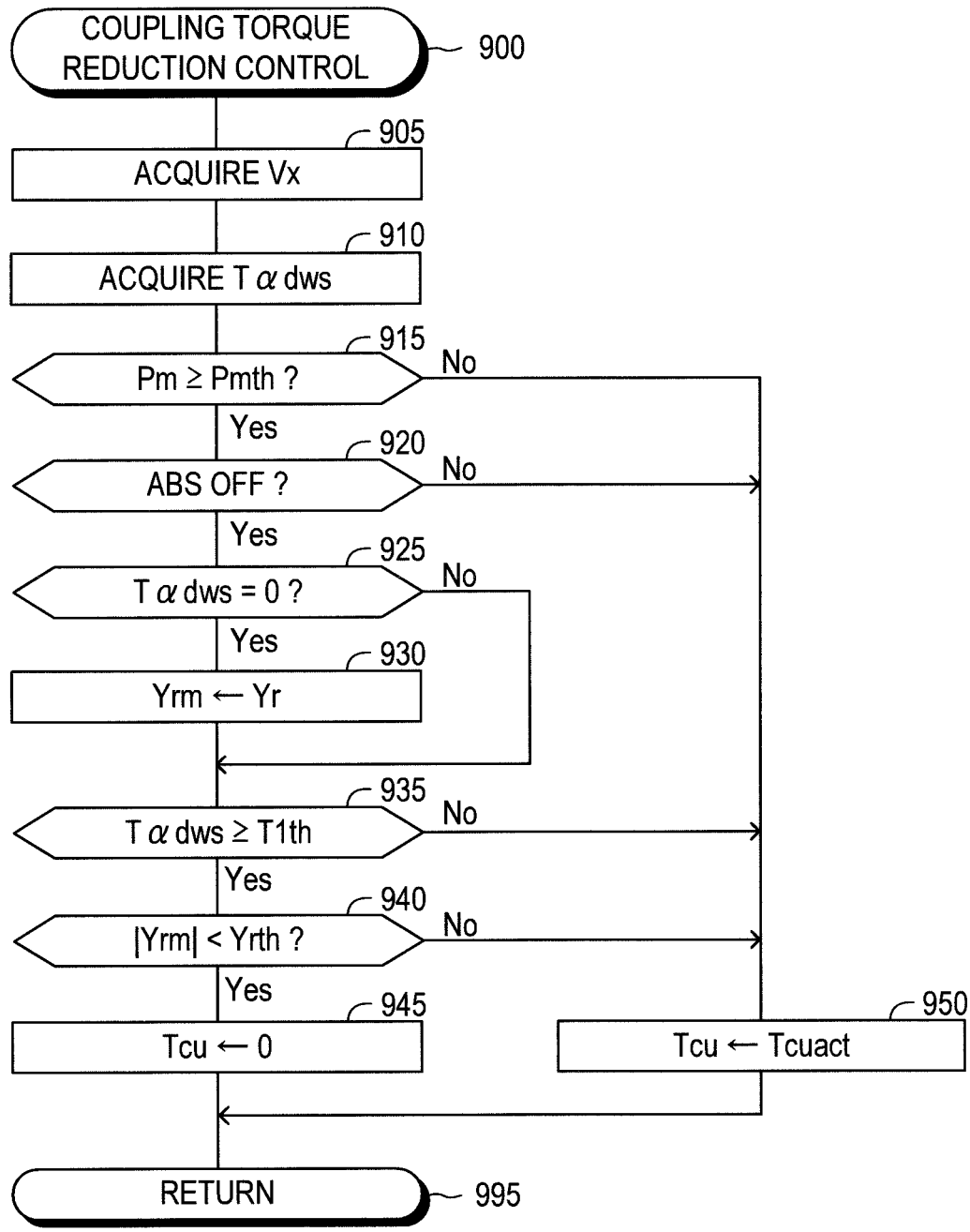
FIG. 9 is a flowchart for illustrating a "coupling torque reduction control routine" executed by a CPU of a braking ECU illustrated in FIG. 1.

In the above embodiment, the CPU of the braking ECU 70 executes the braking control routine shown in FIG. 9. However, the CPU of the 4WD ECU 60 may execute the above routine, or a CPU of a single ECU which is formed by integrating the 4WD ECU 60, the braking ECU 70, and the like with each other may execute the above routine instead of the CPU of the braking ECU 70.

What is claimed is:

1. A control device for a four-wheel drive vehicle, which is applied to a four-wheel drive vehicle having:
a driving unit which generates a driving force;
a center differential device which transmits the driving force to a front wheel rotary shaft and a rear wheel rotary shaft and allows a differential operation between the front wheel rotary shaft and the rear wheel rotary shaft;
a differential restriction device which varies a differential restriction degree between the front wheel rotary shaft and the rear wheel rotary shaft;
a braking device which applies a braking force to each of a plurality of wheels of the vehicle,
wherein, a braking force distribution ratio of rear wheels to front wheels is set so as to be lower than an ideal distribution ratio which is based on a ground contact load ratio of the rear wheels to the front wheels when the differential restriction degree by the differential restriction device is set at a first restriction degree,
the control device comprising:
wheel speed sensors, each detecting a wheel speed which is a rotational speed of each of a plurality of the wheels,
a yaw rate sensor for detecting a yaw rate of the vehicle, and
a control unit configured to:
vary the braking force applied to each of the wheels in response to a braking operation performed by the driver of the vehicle;
estimate a speed of a body of the vehicle as an estimated vehicle body speed using a maximum wheel speed among a plurality of the detected wheel speeds;
calculate a braking slip ratio of each of the wheels based on the estimated vehicle body speed and the respective wheel speeds;
execute an anti-skid control for adjusting the braking force applied to the respective wheels based on the braking slip ratio of the respective wheels; and
set the differential restriction degree by the differential restriction device to a second restriction degree which is larger than the first restriction degree, when the braking operation is being performed,
wherein,
the control unit is configured to:
determine whether a specific state has occurred in which the detected yaw rate is lower than a predetermined yaw rate threshold and a magnitude of a decreasing amount of the maximum wheel speed among a plurality of the detected wheel speeds for a predetermined time is larger than a decreasing amount threshold when the braking operation is being performed; and
set the differential restriction degree by the differential restriction device to a third restriction degree which is smaller than the second restriction degree when it is determined that the specific state has occurred.

2. The control device for a four-wheel drive vehicle according to claim 1,
wherein the control unit is configured to set the differential restriction degree to the third restriction degree by removing the differential restriction given by the differential restriction device.

3. The control device for a four-wheel drive vehicle according to claim 1,
wherein the control unit is configured to;
select the maximum wheel speed among a plurality of the wheel speeds every time a predetermined calculation period elapses; and
when a lower limit guard value is equal to or larger than the selected maximum wheel speed, set the estimated vehicle body speed at a present time point to the lower limit guard value, the lower limit guard value being calculated by subtracting the constant value from the estimated vehicle body speed which was estimated at a time point the predetermined calculation period before the present time point; and
determine that the specific state has occurred when a case in which the lower limit guard value is set as the estimated vehicle body speed continues consecutively over a predetermined number of times.

4. The control device for a four-wheel drive vehicle according to claim 2,
wherein the control unit is configured to:
select the maximum wheel speed among a plurality of the wheel speeds every time a predetermined calculation period elapses; and
when a lower limit guard value is equal to or larger than the selected maximum wheel speed, set the estimated vehicle body speed at a present time point to the lower limit guard value, the lower limit guard value being calculated by subtracting the constant value from the estimated vehicle body speed which was estimated at a time point the predetermined calculation period before the present time point; and
determine that the specific state has occurred when a case in which the lower limit guard value is set as the estimated vehicle body speed continues consecutively over a predetermined number of times.

5. The control device for a four-wheel drive vehicle according to claim 1,
wherein the control unit is configured to set the yaw rate threshold to a value corresponding to a yaw rate which occurs when the vehicle is deemed to be travelling straight.

6. The control device for a four-wheel drive vehicle according to claim 2,
wherein the control unit is configured to set the yaw rate threshold to a value corresponding to a yaw rate which occurs when the vehicle is deemed to be travelling straight.

7. The control device for a four-wheel drive vehicle according to claim 3,
wherein the control unit is configured to set the yaw rate threshold to a value corresponding to a yaw rate which occurs when the vehicle is deemed to be travelling straight.

8. The control device for a four-wheel drive vehicle according to claim 4,
wherein the control unit is configured to set the yaw rate threshold to a value corresponding to a yaw rate which occurs when the vehicle is deemed to be travelling straight.

* * * * *